(12) United States Patent
Hovik

(10) Patent No.: US 6,729,482 B1
(45) Date of Patent: May 4, 2004

(54) AUTOMATED STORAGE AND RETRIEVAL SYSTEM

(75) Inventor: Brian K. Hovik, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/268,177

(22) Filed: Oct. 9, 2002

(51) Int. Cl.⁷ .................................................. A47F 5/02
(52) U.S. Cl. ..................................................... 211/121
(58) Field of Search ............................. 211/1.51, 1.52, 211/1.53, 1.56, 1.55, 1.57, 121; 312/268

(56) References Cited

U.S. PATENT DOCUMENTS

| 3,955,267 A | * | 5/1976 | deCaussin | 483/10 |
| 3,970,349 A | * | 7/1976 | Banys | 312/268 |
| 4,650,264 A | * | 3/1987 | Dahnert | 312/268 |
| 4,676,560 A | * | 6/1987 | Schmitz et al. | 312/268 |
| 6,170,929 B1 | * | 1/2001 | Wilson et al. | 312/268 |

* cited by examiner

Primary Examiner—Alvin Chin-Shue
Assistant Examiner—Sarah Purol
(74) Attorney, Agent, or Firm—Black Lowe & Graham PLLC

(57) ABSTRACT

An automated parts storage and retrieval method is provided. The method includes a frame, a plurality of trays configured to hold a plurality of parts, and a movement method attached to the frame and arranged to move the plurality of trays in a serpentine pattern for retrieval and storage of the plurality of parts. The movement method includes a plurality of sprockets arranged within the frame in a zigzag pattern, at least one chain toothedly engaged within the plurality of sprockets, and a drive motor configured to drive one of the plurality of sockets. The plurality of trays are rotatably attached to the at least one chain. The method includes a computer method for controlling the drive motor based on a selection using a parts selection component and position information sent by a position sensor.

3 Claims, 5 Drawing Sheets

AUTOMATED STORAGE AND RETRIEVAL SYSTEM

FIELD OF THE INVENTION

This invention relates generally to storage and retrieval systems and, more specifically, to automated parts storage and retrieval systems.

BACKGROUND OF THE INVENTION

Many manufacturing processes entail steps that include a choice of a great number of different kinds or types of parts. The parts must be readily available to the people performing the manufacturing process steps in order for the manufacturing process to be as efficient as possible.

Many times, due to the vast amounts of different types of parts, the parts can be difficult to find because they are stored in various bins located in several places on a factory floor. The more time that is spent looking for parts, the longer it takes to manufacture the product, thereby increasing the cost of the product. Also, facilities that are used for holding vast amounts of parts take up valuable floor space. The parts are stored in opened containers, thus exposing the parts to a factory floor environment and requiring the parts to be cleaned before use. Cleaning of parts causes even more delays as well as unnecessarily exposing employees to cleaning solvents.

An example of this manufacturing process is presented by aircraft manufacturing. For example, over 900 different, prefabricated shims are stored in cardboard boxes on roller racks on a factory floor. The shims get dirty due to being exposed to a machine shop-like factory floor environment and must be cleaned thoroughly before application. The roller racks that hold the cardboard boxes take up hundreds of square feet of floor space.

Various proposals have been presented for more efficiently storing and retrieving parts. However, in a manufacturing process that entails extremely large numbers of parts, the storage and retrieval device that have been proposed take up large areas of floor space or are very tall and bulky. It is difficult and expensive to redesign a factory floor to accommodate a storage and retrieval device that is tall and bulky. Further, it is very difficult to move such a device easily and efficiently around the factory floor.

Therefore, there exists an unmet need for an automated storage and retrieval system that takes up less space, keeps parts clean, aides in organizing and stabilizing inventory, and is easily movable about a factory floor.

SUMMARY OF THE INVENTION

The present invention provides an automated parts storage and retrieval system. The system of present invention more efficiently stores large numbers of parts in a single unit that is easy to access, maintains clean parts, and is easy to move about a factory floor with existing equipment.

One embodiment of the system includes a frame, a plurality of trays configured to hold a plurality of parts, and a movement system attached to the frame and arranged to move the plurality of trays in a serpentine pattern for retrieval and storage of the plurality of parts. The movement system includes a plurality of sprockets arranged within the frame in a zigzag pattern, at least one chain toothedly engaged within the plurality of sprockets, and a drive motor configured to drive one of the plurality of sockets.

According to an aspect of the invention, the plurality of trays are rotatably attached to the at least one chain.

Another aspect of the system includes a computer system for controlling the drive motor based on a selection using a parts selection component and position information sent by a position sensor.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
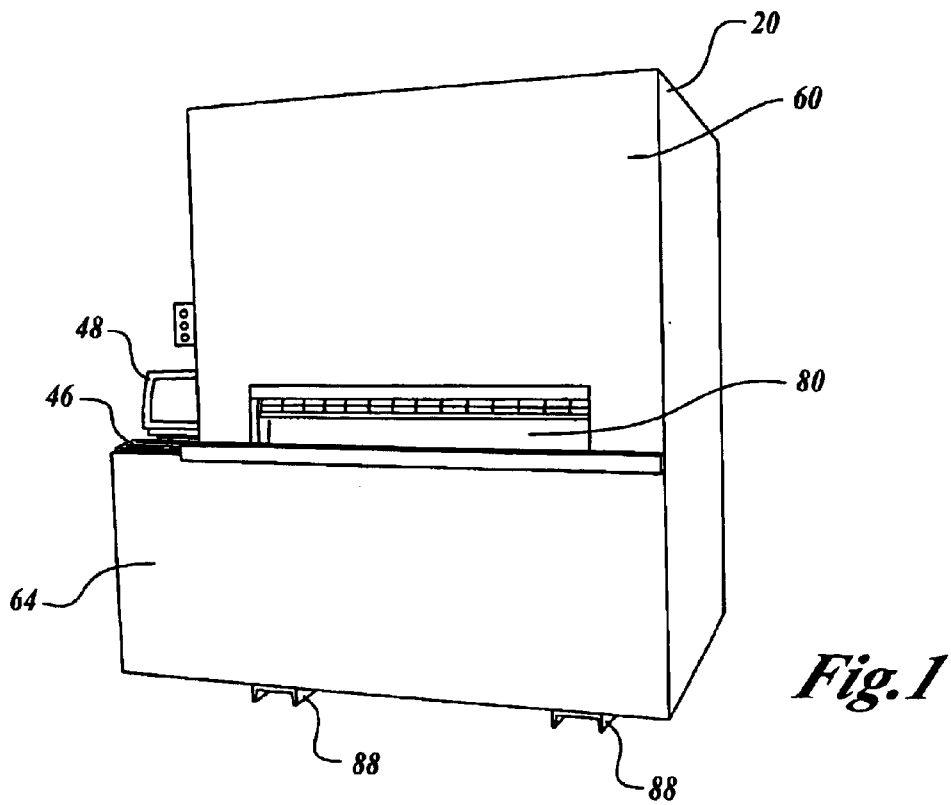
FIG. 1 is a perspective view of the present invention.

FIG. 1 illustrates a perspective view of an automated storage and retrieval device 20. The device 20 includes a main housing 60 that includes the chains, sprockets, and trays. Adjacent to the main housing 60 is a smaller housing section 64 that stores the encoder 34, the drive motor 36, the controller 32, and the computer 30. On top of the section 64, suitably at a comfortable standing position for user interaction, is a display 48 and a user interface 46. The device 20 includes forklift footings 88 attached to the base of the housing 60 that are sized to receive forklift forks. Lifting hooks (not shown) are attached to the top of the housing 60.

A parts selection window 80 is located on a front face of the housing 60. Upon selection of a part using the computer 30, the tray containing the part is moved to the window 80.

Figure 2:
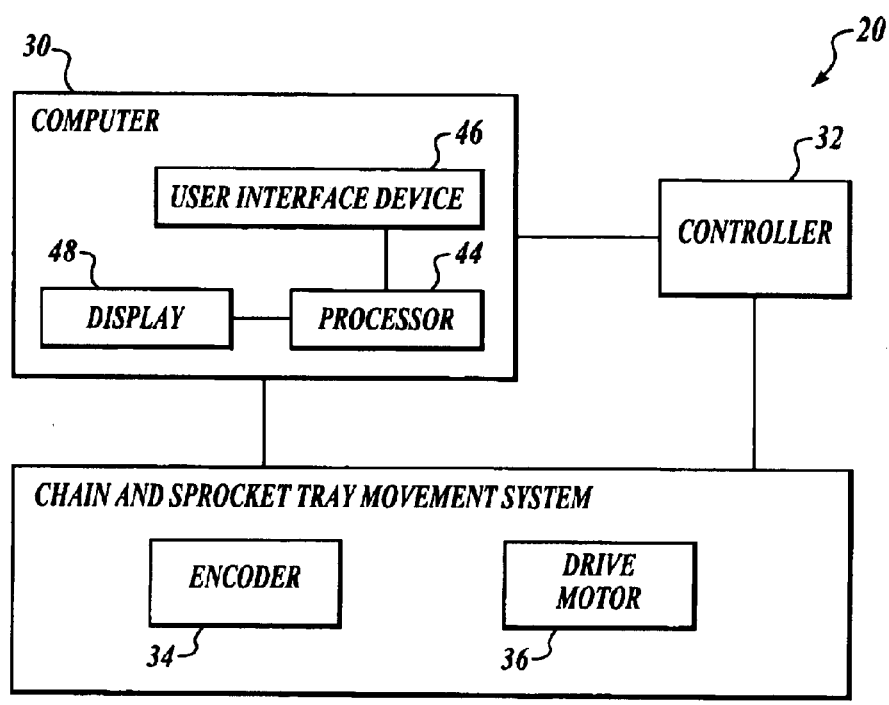
FIG. 2 is a block diagram of an automated storage and retrieval system formed in accordance with the present invention.

FIG. 2 illustrates a block diagram of the non-limiting example automated storage and retrieval system 20 that stores and provides automated access to large amounts of parts in a small space. The system 20 includes a computer 30 that is suitably coupled to a controller 32. The controller 32 and the system 20 are coupled to a chain and sprocket tray movement system 40. The chain and sprocket tray movement system 40 include an encoder 34 and a drive motor 36. The chain and sprocket tray movement system 40 also includes one or more chains that serpentine around sprockets. The chains support trays that support part bins. The chain, sprockets, trays, and bins are shown in the following figures. The computer 30 includes a processor 44 that is coupled to the user interface 46, and a display 48. The computer 30 is suitably a programmable logic controller (PLC), such as that produced by Allen-Bradley, Inc.

In one non-limiting embodiment, the computer 30 is preprogrammed to identify what parts are located on what tray within the system 20. The encoder 34 provides a position signal that indicates the position of the trays within the chain and sprocket tray movement system 40. The computer 30 receives the position signal from the encoder 34. The user, using the user interface 46, makes a request for a part by interacting with the user interface 46 and the display 48. The processor 44 sends a control signal to the controller 32 based on the request and the position signal. The controller 32 converts the control signal from the processor 44 into electrical signals for the drive motor 36. The drive motor 36 then moves the chain accordingly.

Figure 3:
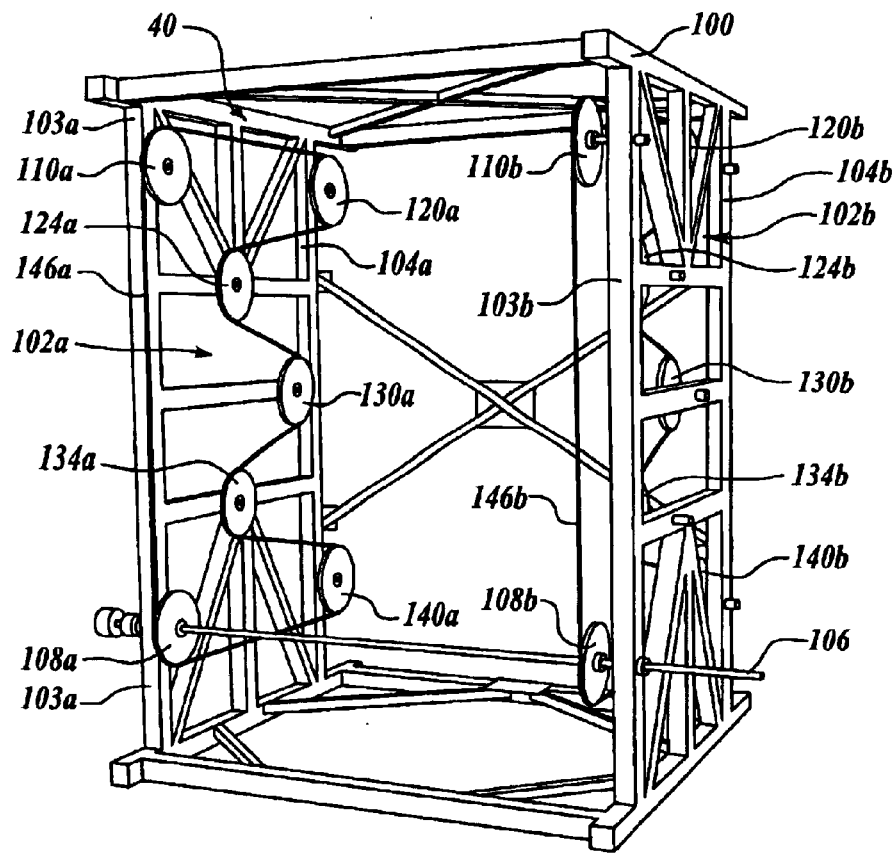
FIG. 3 is a perspective skeletal view of the present invention.

The following figures illustrate a non-limiting example embodiment of the automated storage and retrieval system 20. FIG. 3 illustrates a skeletal view of the housing 60. The housing 60 is suitably formed of a welded aluminum internal frame 100 that supports the sprockets. In FIG. 3, trays are not shown for clarity purposes. The housing 60 includes first and second chain/sprocket sections 102a and 102b. The first and second chain/sprocket sections 102a and 102b are located on opposing sides of the frame 100. The first side of the frame 100 includes a forward vertical beam 103a and an aft vertical beam 104a. The second side of the frame 100 includes a forward vertical beam 103b and an aft vertical beam 104b. A drive shaft 106 passes through the forward vertical beams 103a,b and are attached to drive sprockets 108a,b near the beams 103a,b, respectively. Upper forward sprockets 110a,b are rotatably mounted to an upper portion of the forward vertical beams 103a,b, respectively. Upper aft sprockets 120a,b (b is hidden by the frame 100) are rotatably attached to the aft beams 104a,b, respectively, at approximately the same height as the sprockets 110a,b.

Upper middle sprockets 124a,b (b is hidden by the frame 100) are rotatably attached to the frame 100 between the sprockets 110a,b and sprockets 120a,b, respectively. Middle aft sprockets 130a,b are rotatably attached to the frame 100 slightly below the upper middle sprockets 124a,b and slightly closer to the aft beam 104a,b, respectively. Lower middle sprockets 134a,b are rotatably attached to the frame 100 directly below the upper middle sprockets 124a,b, below Middle aft sprockets 130a,b, and above the drive sprockets 108a,b. Lower aft sprockets 140a,b are rotatably attached to the aft beam 104a,b at the same height as the drive sprockets 108a,b.

Chains 146a,b run through each set of sprockets in the following order: 108a,b, 110a,b, 120a,b, 124a,b, 130a,b, 134a,b, 140a,b, then back to 108a,b. The location of the sprockets is optimized based on the size of the trays that will connect to the chains. The chains and sprockets guide the trays through the housing 60 in a pattern that most efficiently uses the volume of space within the housing 60. An example pattern is a zigzag or serpentine pattern that moves the trays through the volume of the housing 60 without running into other trays. Thus, the housing 60 holds a large amount of parts without occupying too much floor space or extending too high vertically.

Figure 4:
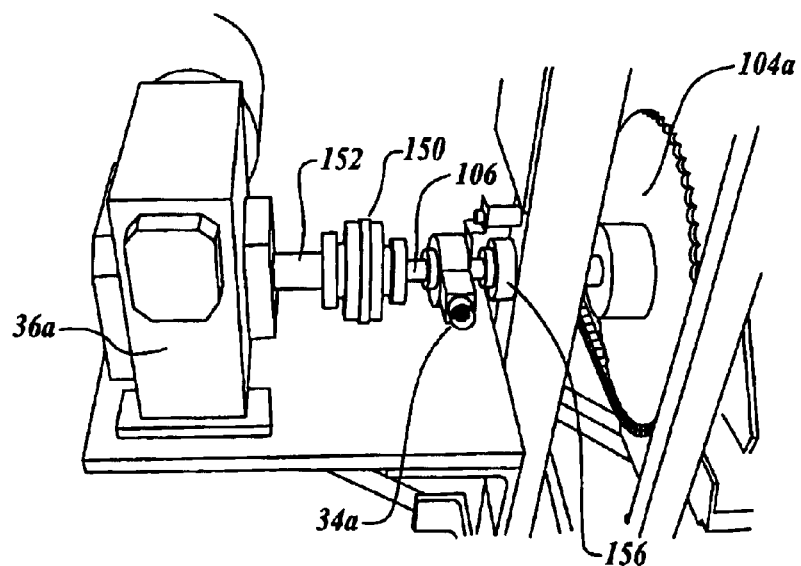
FIG. 4 is a perspective view of the drive mechanisms for the present invention.

FIG. 4 illustrates a dampening device 150 that attaches between the shaft 106 and a shaft 152 from a drive motor 36a. The shaft 106 passes through an encoder 34a, then through a pillow block bearing assembly 156 mounted in the beam 103a. The dampening device 150 dampens any sudden movements created by the motor 36a thereby smoothly starting and stopping the shaft 106. The encoder 36a detects rotations of the shaft 106 and sends that information to the computer 30 through a data port. A non-limiting example of the drive motor 36a is an Alling-Lander DC motor. A non-limiting example of the dampening device 150 is a Zero-max coupler. A non-limiting example of the encoder 34a is a Dynapar encoder.

Figure 5:
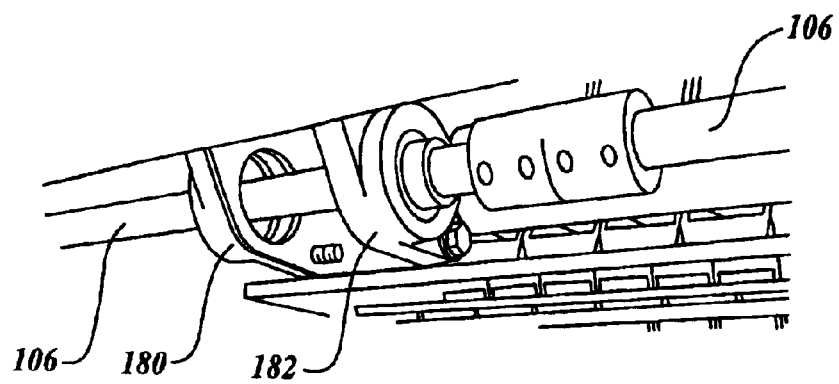
FIG. 5 is a perspective view of drive shaft supports.

As shown in FIG. 5, the shaft 106 is supported between the drive sprockets 108a,b by a pair of bearing shaft supports 180 and 182. The shaft supports 180 and 182 are attached to the frame 100 (not shown).

Figure 6:
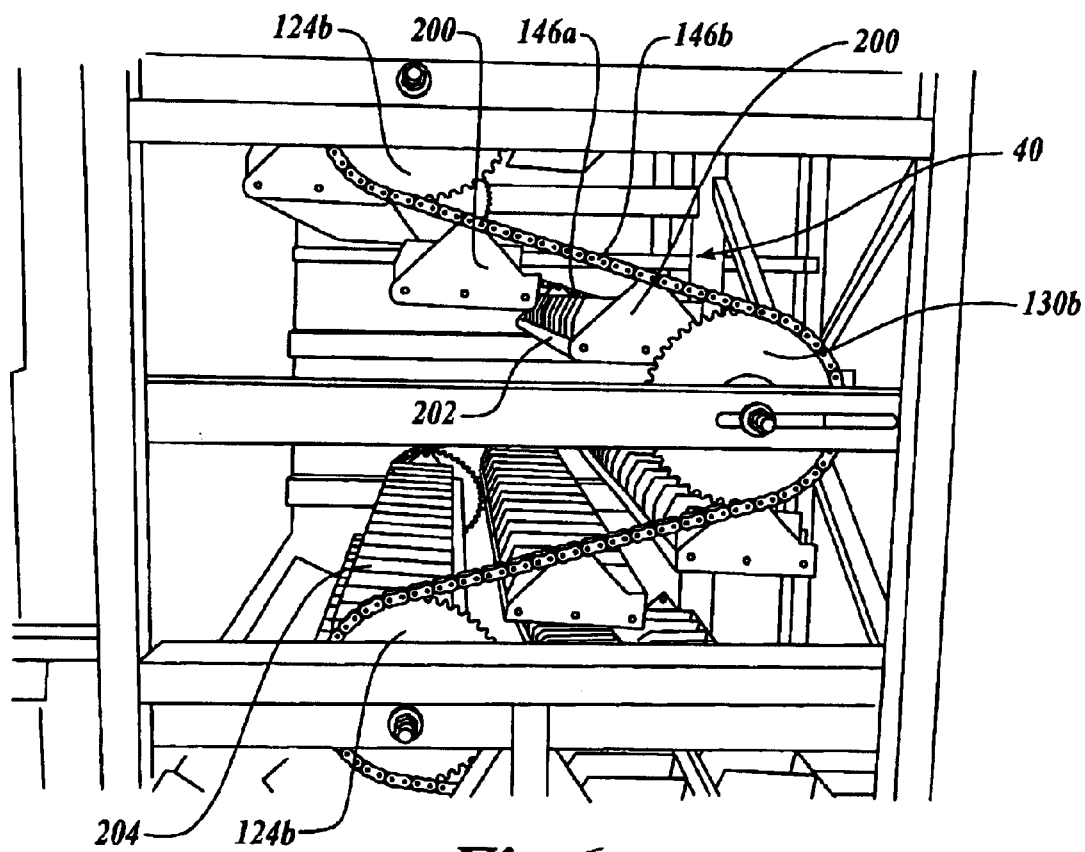
FIG. 6 is a side view of a portion of the present invention.

FIG. 6 illustrates a side view of the chain and sprocket tray movement system 40. Trays 200 rotatably hang from opposing pins on each of the chains 124a,b. Each tray 200 is attached at opposite ends to the chains 124a,b in order to be level. The rotatably attached trays 200 are spaced apart enough to allow free-hanging motion throughout the travel of the chains 124a,b. As the chains 124a,b moves around the sprockets, the trays 200 move about the space within the frame 100. Bins 204 rest on the trays 200.

Figure 7:
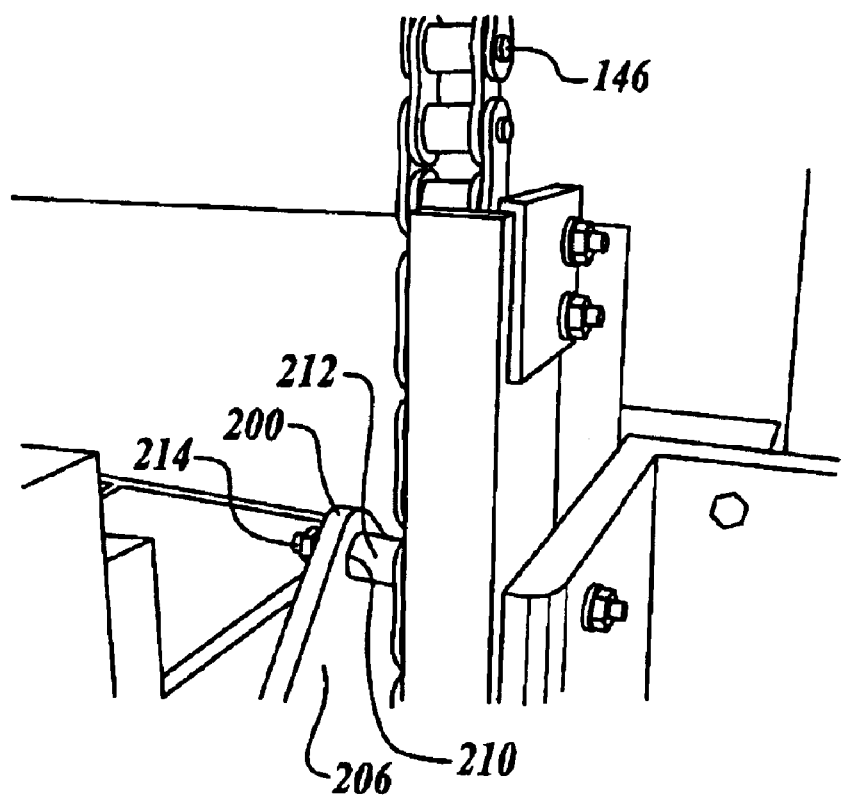
FIG. 7 is a perspective view of a connection between a chain and a parts tray.

FIG. 7 illustrates attachment of each tray 200 to the chains 124a,b. Each tray 200 includes a base 202 (FIG. 6) and end walls 206 that attach to the base 202. An opening 210 in the end walls 204 receives a bolt 214 that attaches to a pin in the chain or is an extension of the pin in the chain. A spacer 212 is placed between the end walls 206 and the chains 124a,b. The spacer 212 allows movement of the tray 200 about the bolt 214, thereby allowing the tray to hang from the bolt 214. In one non-limiting example, the Chains 146a,b are suitably standard ANSI 60 chains of equal length with ¼ inch integrated rivet/pin for attaching the trays. The trays are suitably made of stainless steel and the bins are made of plastic.

Figure 8:
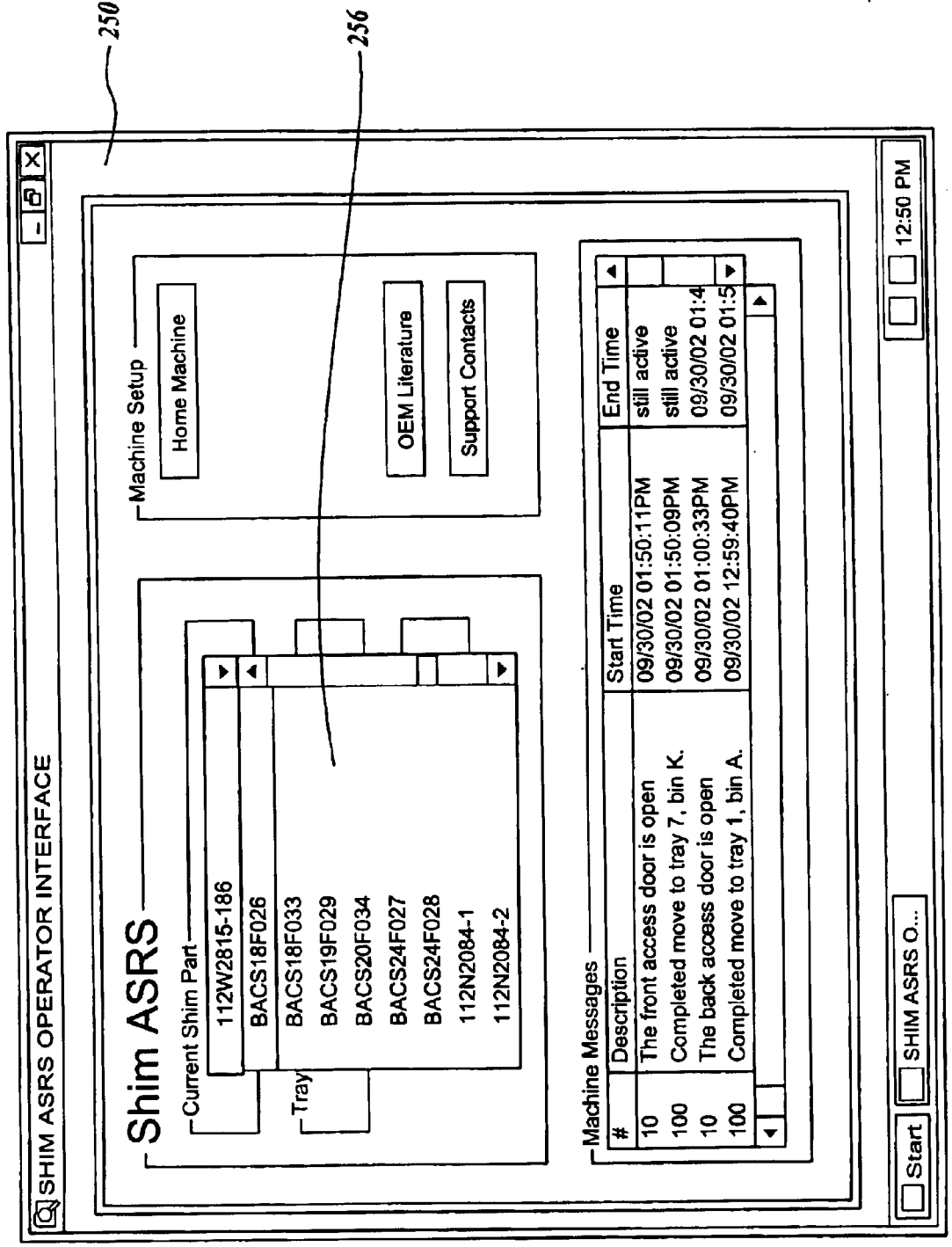
FIG. 8 illustrates a graphical user interface formed in accordance with the present invention.

FIG. 8 illustrates a user interface display window 250 that is presented on the display 48. The user interface window 250 includes a pull-down scrollable window 256 that allows a user using a user interface device 46 to select parts that are stored within the system 20. Once the user selects the parts from the list presented in the window 256, the computer 30 generates a control signal that ends up causing the chain and sprocket tray movement system to rotate to present the tray that includes the selected part within the window 80 of the housing 60.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An automated parts storage and retrieval system, comprising:
   a frame;
   a plurality of trays configured to hold a plurality of parts; and
   a movement system including:
      a drive motor;
      a shaft coupled to the motor;
      a chain and sprockets configured to support the plurality of trays, at least one of the sprockets being coupled to the shaft,
      wherein the sprockets are rotatably attached to the frame,
      wherein the chain is toothedly attached to the sprockets in a serpentine pattern for retrieval and storage of the plurality of parts;
      for determining, shaft encoder for generating a signal of the shaft position;
      a computer system including a user interface for selecting a part,
      wherein the computer system controls the drive motor based on the shaft position signal and a selected part.

2. An automated parts storage and retrieval method, comprising:
   supporting a plurality of trays on one or more chain;
   toothedly attaching the one or more chain to a plurality of sprockets that are rotatably attached to a frame in a zigzag pattern;

driving at least one of the sprockets with a shaft coupled to a drive motor;
sensing a position of the shaft using an encoder;
programming a controller to associate a part located on a tray with a position of the one or more chains;
selecting a part; and
controlling the drive motor based on the selected part, the sensed position of the shaft, and the programmed controller.

3. An automated parts storage and retrieval system, comprising:
 a frame including two fork lift tyne guides;
 a plurality of trays configured to hold a plurality of parts; and
 a movement system including:
  a drive motor;
  a shaft coupled to the motor;
  a chain and sprockets configured to support the plurality of trays, at least one of the sprockets being coupled to the shaft,
  wherein the sprockets are rotatably attached to the frame,
  wherein the chain is toothedly attached to the sprockets in a serpentine pattern for retrieval and storage of the plurality of parts;
 shaft encoder for generating a signal of the shaft position;
 a computer system including a user interface for selecting a part,
 wherein the computer system controls the drive motor based on the shaft position signal and a selected part.

* * * * *